(12) United States Patent
Croxford et al.

(10) Patent No.: US 11,514,312 B2
(45) Date of Patent: Nov. 29, 2022

(54) COMPUTER VISION OPTIMISATION FOR SMALL VALUE CHANGES

(71) Applicants: Apical Limited, Cambridge (GB); Arm Limited, Cambridge (GB)

(72) Inventors: Daren Croxford, Cambridge (GB); Sharjeel Saeed, Cambridge (GB)

(73) Assignee: ARM LIMITED, Cambridge (GB)

( * ) Notice: Subject to any disclaimer, the term of this patent is extended or adjusted under 35 U.S.C. 154(b) by 718 days.

(21) Appl. No.: 16/558,686

(22) Filed: Sep. 3, 2019

(65) Prior Publication Data
US 2020/0111001 A1 Apr. 9, 2020

(30) Foreign Application Priority Data
Oct. 4, 2018 (GB) ...................................... 1816223

(51) Int. Cl.
*G06N 3/08* (2006.01)
*G06N 20/10* (2019.01)
*G06T 5/20* (2006.01)

(52) U.S. Cl.
CPC .............. *G06N 3/08* (2013.01); *G06N 20/10* (2019.01); *G06T 5/20* (2013.01); *G06T 2207/20081* (2013.01); *G06T 2207/20084* (2013.01)

(58) Field of Classification Search
CPC ............ G06N 3/08; G06N 20/10; G06N 3/10; G06N 3/0481; G06N 3/0454; G06T 5/20; G06T 2207/20081; G06T 2207/20084; G06K 9/627; G06V 10/454; G06V 10/764; G06V 20/00
See application file for complete search history.

(56) References Cited

U.S. PATENT DOCUMENTS

| | | | | |
|---|---|---|---|---|
| 10,255,683 | B1 * | 4/2019 | Gopal | G06V 20/48 |
| 10,755,162 | B2 * | 8/2020 | Han | G06N 3/0454 |
| 10,839,222 | B2 * | 11/2020 | Croxford | G06V 10/764 |
| 10,891,538 | B2 * | 1/2021 | Dally | G06N 3/063 |
| 10,896,369 | B2 * | 1/2021 | Liu | G06F 17/16 |

(Continued)

FOREIGN PATENT DOCUMENTS

WO 2017214728 A1 12/2017

OTHER PUBLICATIONS

Bertasius, Gedas, Lorenzo Torresani, and Jianbo Shi. "Object detection in video with spatiotemporal sampling networks." Proceedings of the European Conference on Computer Vision (ECCV). 2018. (Year: 2018).*

(Continued)

*Primary Examiner* — Andrae S Allison
(74) *Attorney, Agent, or Firm* — EIP US LLP

(57) ABSTRACT

Aspects of the present disclosure relate to a computer-implemented method of processing data portion. The method comprises processing a first data portion in a convolutional neural network to generate a first input to an activation function in the convolutional neural network; providing a first output by applying the activation function to the first input; and storing an indicator, representative of the first input to the activation function, for the first data portion. The method further comprises determining whether to provide a second output by applying the activation function to a second input, generated from a second data portion, based at least in part on an evaluation of the indicator for the first data portion.

15 Claims, 10 Drawing Sheets

(56) References Cited

U.S. PATENT DOCUMENTS

| | | | |
|---|---|---|---|
| 10,917,655 B2* | 2/2021 | Croxford | H04N 19/543 |
| 2019/0340785 A1* | 11/2019 | Lopich | G06T 7/248 |
| 2020/0186816 A1* | 6/2020 | Croxford | H04N 19/172 |
| 2020/0320287 A1* | 10/2020 | Porikli | G06T 7/11 |

OTHER PUBLICATIONS

X. Zhu, J. Dai, L. Yuan and Y. Wei, "Towards High Performance Video Object Detection," 2018 IEEE/CVF Conference on Computer Vision and Pattern Recognition, 2018, pp. 7210-7218, doi: 10.1109/CVPR.2018.00753. (Year: 2018).*

GB Search Report dated Apr. 6, 2021 for Application No. GB1816223.0.

* cited by examiner

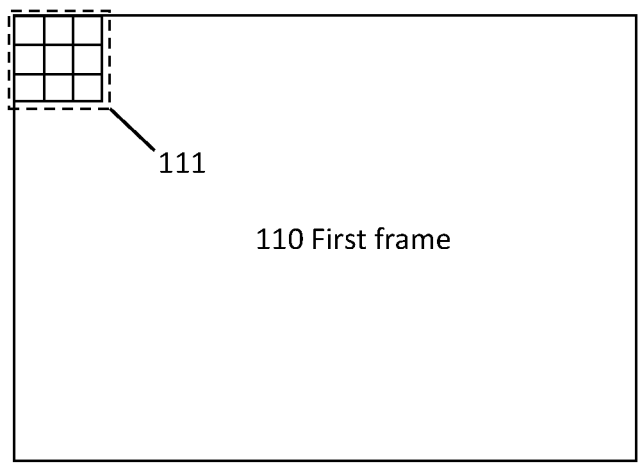
a)
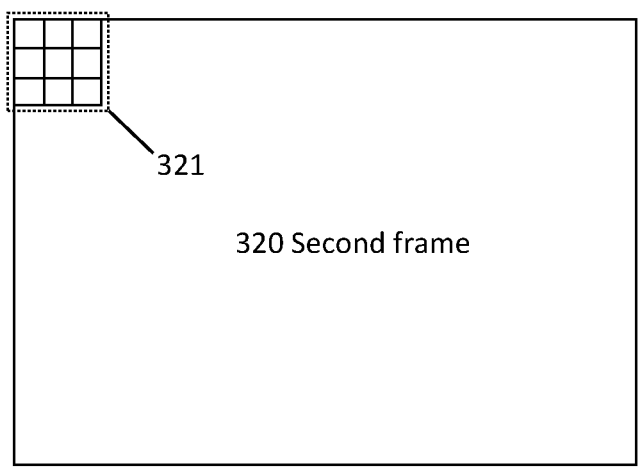
b)
Figure 3

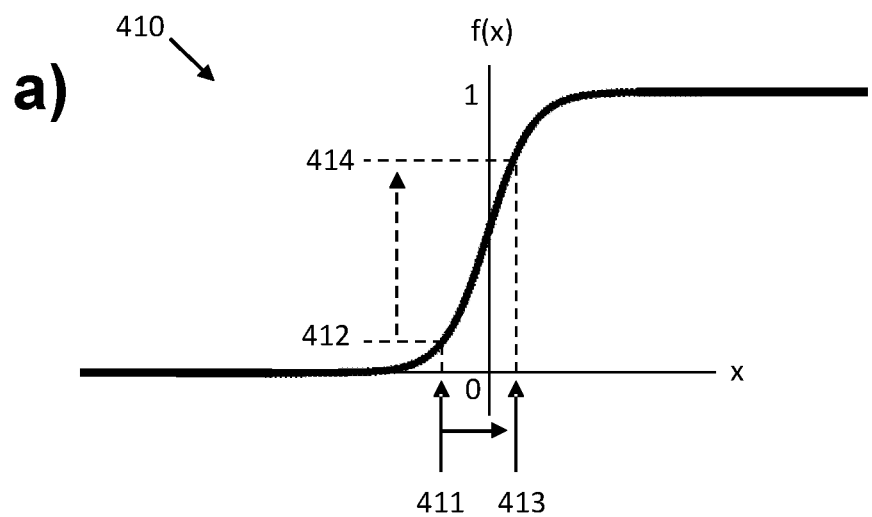
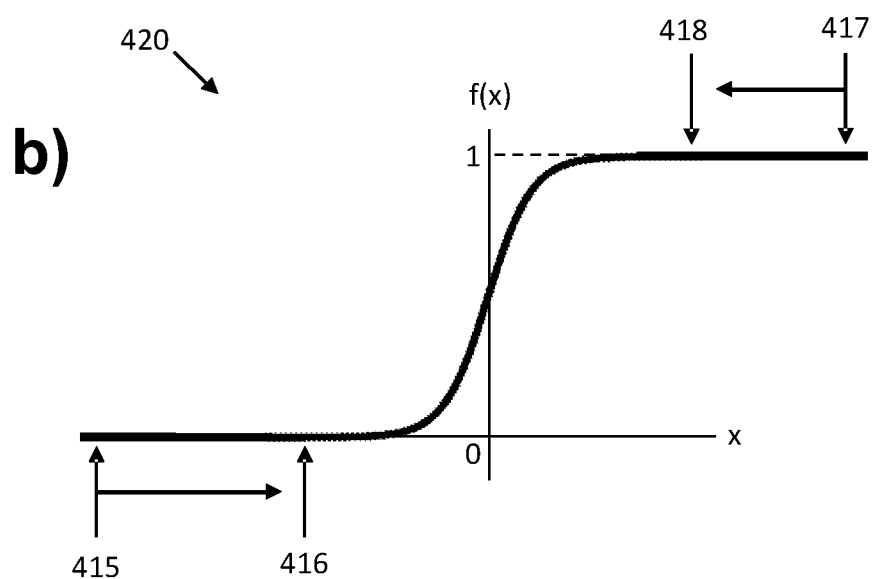
Figure 4

600

610 Process a first data portion in a CNN to generate a first input to an activation function in the CNN

620 Provide a first output by applying the activation function to the first input

630 Store an indicator, representative of the first input to the activation function, for the first data portion

640 Determine whether to provide a second output by applying the activation function to a second input, generated from a second data portion, based at least in part on an evaluation of the indicator for the first data portion

Figure 6

COMPUTER VISION OPTIMISATION FOR SMALL VALUE CHANGES

CROSS-REFERENCE TO RELATED APPLICATIONS

This application claims the benefit under 35 U.S.C. § 119(a) and 37 CFR § 1.55 to United Kingdom patent application no. GB1816223.0 filed on Oct. 4, 2018, the entire content of which is incorporated herein by reference.

BACKGROUND OF THE INVENTION

Field of the Invention

The present disclosure relates to methods and apparatus for processing data.

Description of the Related Technology

Methods to process data, for example to perform feature detection operations such as object detection or object recognition, may be computationally intensive. It is desirable to reduce the processing demands of such methods.

SUMMARY

According to a first aspect of the present disclosure, there is provided a computer-implemented method of processing data, the method comprising processing a first data portion in a convolutional neural network to generate a first input to an activation function in the convolutional neural network; providing a first output by applying the activation function to the first input; storing an indicator, representative of the first input to the activation function, for the first data portion; and determining whether to provide a second output by applying the activation function to a second input, generated from a second data portion, based at least in part on an evaluation of the indicator for the first data portion.

According to a second aspect of the present disclosure, there is provided a system for processing image data, the system comprising processing circuitry for a convolutional neural network, wherein the processing circuitry is configured to process first image data, corresponding to a first image frame, in a convolutional neural network to generate a first input to an activation function in the convolutional neural network; process first image data to generate a first signature representative of the first image data; provide a first output by applying the activation function to the first input; store an indicator, representative of the first input to the activation function, for the first image data; process second image data, corresponding to a second image frame, to generate a second signature representative of the second image data; compare the first signature with the second signature based at least in part on an evaluation of the indicator for the first image data; and determine whether to provide a second output by applying the activation function to a second input, generated from the second image data, based at least in part on an evaluation of the indicator for the first image data.

According to a third aspect of the present disclosure, there is provided a non-transitory, computer-readable storage medium comprising instructions which, when executed by a computing device, cause the computing device to process a first data portion in a convolutional neural network to generate a first input to an activation function in the convolutional neural network; provide a first output by applying the activation function to the first input; store an indicator, representative of the first input to the activation function, for the first data portion; and determine whether to provide a second output by applying the activation function to a second input, generated from a second data portion, based at least in part on an evaluation of the indicator for the first data portion.

Further features and advantages of the present disclosure will become apparent from the following description of preferred embodiments of the disclosure, given by way of example only, which is made with reference to the accompanying drawings.

BRIEF DESCRIPTION OF THE DRAWINGS

FIG. 3 is a schematic representation of examples of image data associated with a frame;

FIG. 4 is a schematic representation of examples of an activation function;

FIG. 6 is a block diagram of a method of processing a data portion;

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Methods described herein relate to processing a data portion using a computing system. The data portion is processed using the computing system to detect at least one class of object in the data portion. The method involves processing the data portion using a neural network configured to detect a particular class of objects. The neural network allows objects belonging to a particular class of objects to be detected in the data portion.

In one example, the data portion processed by the neural network may be image data corresponding to an image frame. Multiple frames of image data make up video data that comprises a video. Portions of video data may remain relatively unchanged from frame to frame. As an illustrative example, if the video data has been obtained from a security camera at a fixed position, the portion of the video data corresponding to a background of a scene, which may stay the same over time, may also remain the same over a series of frames.

Processing video data, for example to perform a feature detection operation such as object detection or object recognition, typically requires a significant amount of computation. However, some of this processing may be redundant if portions of the video data have not changed or have changed a relatively small amount over time.

Figure 1:
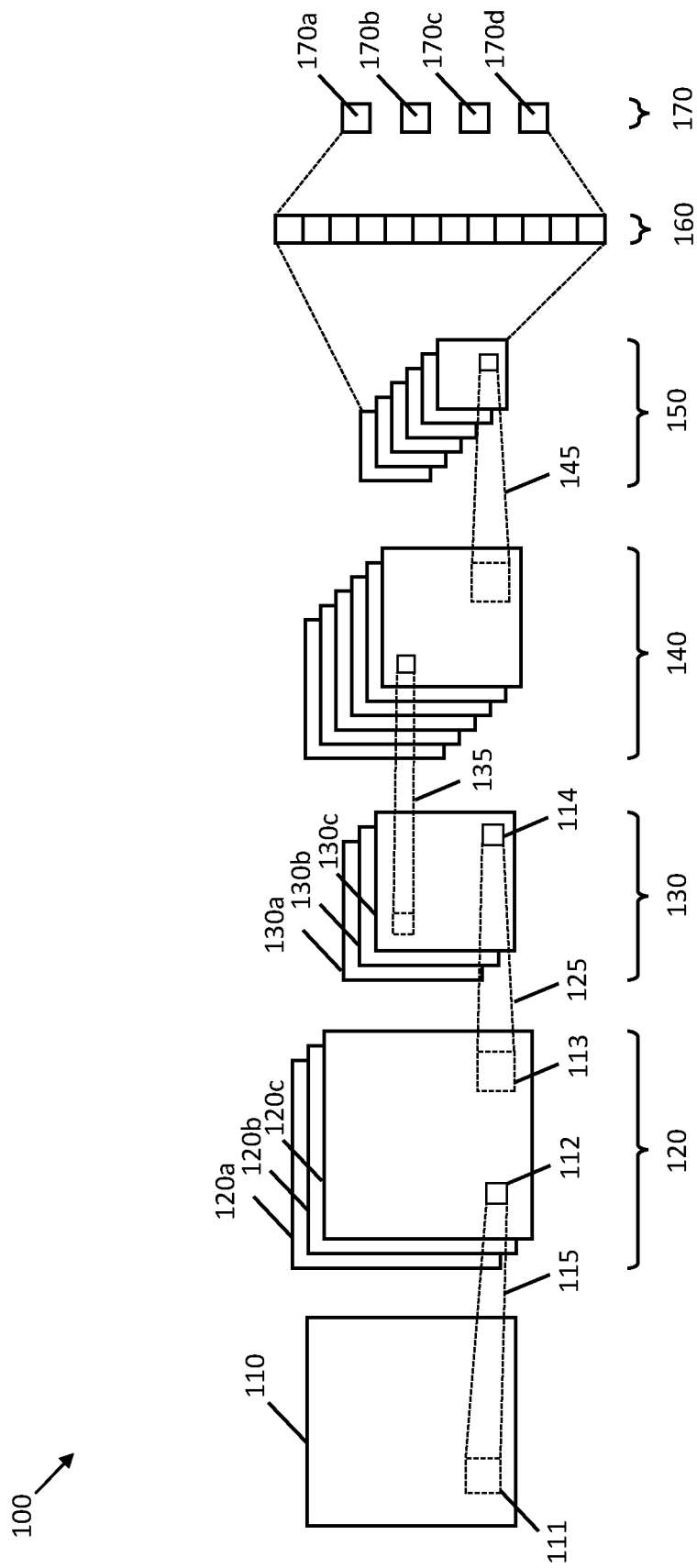
FIG. 1 is a schematic representation of a convolutional neural network.

FIG. 1 is a schematic representation of a convolutional neural network (CNN) 100. The CNN 100 includes a number of different layers 110, 120, 130, 140, 150, 160, 170. The CNN may include an input layer 110, a plurality of convolutional layers 120, 140, a plurality of pooling layers 130, 150, a plurality of fully connected layers 160 and an output layer 170. In this example, the input layer 110 corresponds to an input to the CNN such as image data 110.

The image data 110 is for example 224 pixels wide and 224 pixels high and includes 3 colour channels (such as a red, green and blue colour channel). The image data 110 may undergo convolutional by the convolution layer 120. The convolutional layer (further described in relation to FIG. 2) typically extracts particular features from the input data to create activation maps or feature maps 120a, 120b, 120c. A region 111 of the input data 110 is shown schematically undergoing convolution 115 to create an output 112. Convolution layers typically contain filters or kernels that are used to extract the particular features from the input data 110. Each kernel of the convolutional layer 120 will produce a corresponding feature map 120a, 120b, 120c. The feature maps 120a, 120b, 120c of the convolutional layer 120 may then undergo pooling 125 before they are input into a second convolutional layer 140. Pooling for example allows values for a region of an image or a feature map to be aggregated or combined. A region 113 of the feature map 120c is pooled 125 to create a pooled output 114.

In some examples, a max pooling procedure can be used. In such a scenario, the highest value in a, say, 2×2 region 113 of each feature map e.g. 120c may be determined. The highest value can then be used as an input to the second convolutional layer 140. As such, the 2×2 region 113 is now reduced to a 1×1 region 114.

Other such pooling procedures may be used, such as average pooling or L2-norm pooling. Regardless of the pooling procedure used, pooling typically reduces the amount of computation for subsequent layers of the CNN. This is shown schematically in FIG. 1 as a reduction in size of the feature maps 120a, 120b, 120c of the convolution layer 120 compared to the pooled feature maps 130a, 130b, 130c of the pooling layer 130.

After the input data 110 has been processed by the convolutional layer 120 and the pooling layer 130, processing by a second convolutional layer 140 and second pooling layer 150 may be performed. The feature maps 130a, 130b, 130c may be processed by further convolutional 135 by the convolution layer 140 and pooled 145 by the pooling layer 150.

While only two convolutional layers 120, 140 and two pooling layers 130, 150 are shown in FIG. 1 for simplification, it is to be appreciated that CNNs may have a greater number of layers and be significantly more complex.

After the convolutional and pooling layers 120-150, a fully connected layer 160 uses the feature maps of the last layer (in this example pooling layer 150) for classification. The fully connected layer 160 has connections to all the feature maps from the previous layer. This differs from the convolutional layers 120, 140 that may only have connections to local regions of the previous layer. The feature maps from the convolutional and pooling layers 120-150 represent high-level features of the input image 110. The fully connected layer 160 uses the features to classify the input image 110 into various outputs 170a, 170b, 170c, 170d. The fully connected layer 170 may use a soft-max activation function that provides a probability for each possible output that sums to one.

In general, neural networks such as the CNN of FIG. 1 may undergo what is referred to as a training phase, in which the neural network is trained for a particular purpose. In an illustrative example, the CNN of FIG. 1 may be used to identify animals from static photographic images. Given an input image 110 of a static photographic image of an animal, the CNN can be used to classify the animal into one of four categories e.g. elephant 170a, tiger 170b, swan 170c or horse 170d. After processing the image 110 with the CNN, the output probability for each category may be as follows: elephant 0.01, tiger 0.94, swan 0.04, horse 0.01. As such, the image of the animal is categorised as a photo of a tiger.

A neural network typically includes a number of interconnected nodes, which may be referred to as artificial neurons, or neurons. The internal state of a neuron (sometimes referred to as the activation) typically depends on an input received by the neuron, kernel weights and a bias. The output of the neuron then depends on the input, the kernel weights, the bias and the activation. The output of some neurons is connected to the input of other neurons, forming a directed, weighted graph in which edges (corresponding to neurons) or vertices (corresponding to connections) of the graph are associated with weights, respectively. The weights and biases may be adjusted throughout the training phase of the neural network, altering the output of individual neurons and hence of the neural network as a whole.

Figure 2:
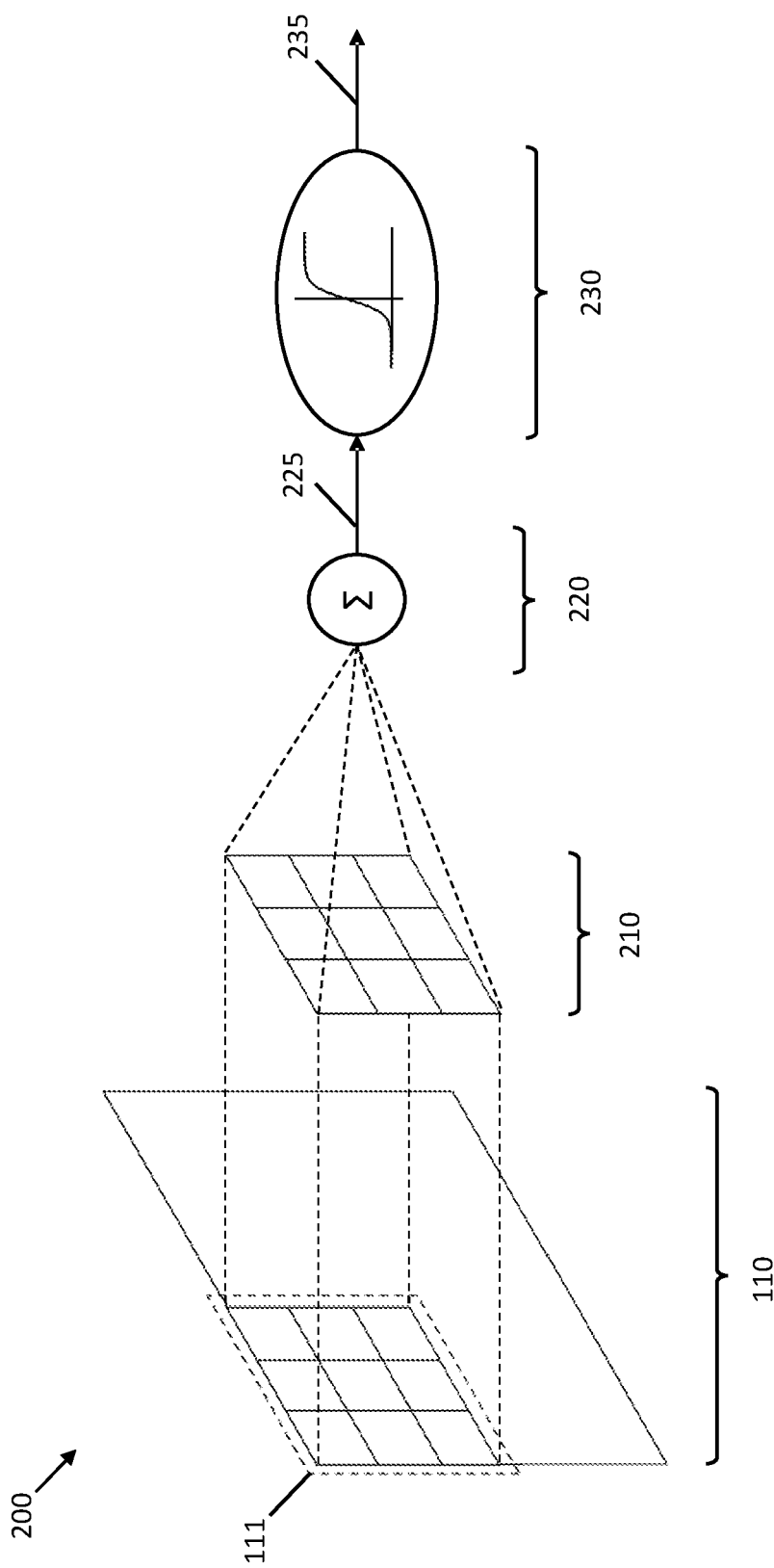
FIG. 2 is a schematic representation of elements of a neuron in a convolutional neural network.

FIG. 2 is a schematic representation 200 of elements of a neuron in a CNN. Multiple neurons may make up a convolutional layer 120, 140 in a CNN 100. A neuron may comprise of a filter or kernel 210, a multiply-and-accumulate (MAC) function 220 and an activation function 230. The input to a neuron may be an input image 110 from the input layer, a region 111 of the input image 110, a feature map e.g. 120a-c from a previous convolutional layer or a pooled feature map 130a-c from a previous pooling layer 130.

The kernels allow features of the image data 110 to be identified. For example, some of the kernels may be used to identify edges in the image represented by the image data and others may be used to identify horizontal or vertical features in the image (although this is not limiting, and other kernels are possible). The precise features that the kernels identify will depend on the object that the CNN 100 is trained to identify. The kernel 210 of FIG. 2 is for example a 3×3×1 matrix, which may be convolved with the image region 111 of the image data 110 with a stride of 1. Convolution of the image region 111 with the kernel 210 allows the kernel to identify features the kernel is designed to detect.

A kernel may be a three-dimensional matrix, for example, with dimensions of 3×3×n. In such cases whereby the kernel is in a convolutional layer, the value of n will be the number of feature maps from a previous layer in the CNN.

Convolution generally involves multiplying each pixel of an image region 111 (in this example a 3×3 image region) by a weight in the kernel 210 before adding the result of this operation to the result of the same operation applied to neighbouring pixels or neighbouring feature map elements. A stride for example refers to the number of pixels or feature map elements a kernel 210 is moved by between each operation. A stride of 1 therefore indicates that, after calculating the convolution for a given 3×3 image region, the kernel is moved across the image by 1 pixel and the convolution is calculated for a subsequent image region. This process may be repeated until the kernel has been convolved with the entire image, the entire portion of the image for which a convolution is to be calculated, or with the entirety of a feature map the kernel is to be convolved with. A convolution generally involves a multiplication operation and an addition operation (sometimes referred to as a multiply-accumulate operation). Thus, a neural network accelerator, which may be dedicated to implementing a neural network, may include a multiplier-accumulator (MAC) unit configured to perform these operations.

In the example of FIG. 2, the image region 111 of the image data 110 is multiplied with the weights of the kernel 210 before accumulation 220. In cases where the image data 110 has n number of channels, the kernel 210 will have n number of channels i.e. a matrix of 3×3×n. A bias value may then be applied to the accumulated result 220. The resulting value 225 may then be input as an input value 225 into an activation function 230.

The input value 225 is passed through the activation function 230, creating an output value 235. The activation function 230 of the neuron determines whether the neuron 'activates'. For example, the neuron will only activate if the kernel 210 convolving the image region 111 has identified the features the kernel 210 is looking for. As such, the multiply-and-accumulating 220 will result in a high or positive input value 225 to the activation function 230. This results in a high output value 235, in other words, the neuron is 'activated'.

In another example, the kernel 210 convolving the image region 111 does not identify the features the kernel 210 is looking for. As such, the multiplying-and-accumulating 230 will result in a low or negative input value 225 to the activation function 230. This results in an output value 235 of zero i.e. the neuron is not 'activated'.

An activation function (sometimes referred to as a rectifier) may be used to map a first range of values to a pre-determined second range of values, such as a range between zero and one. The activation function may be used to increase the nonlinear output of the neuron and is therefore often a non-linear function. Examples of activation functions include an identity function, a binary step function, a logistic function, an inverse square root function, a sigmoid function (schematically shown in the activation function 230 in FIG. 2), a hyperbolic tangent function, a rectified linear unit (ReLU) function and a leaky ReLU function, although other activation functions are possible. By using an activation function, the amount of data to be processed may be reduced (as some inputs may be mapped to 0, and therefore may not require further processing). Furthermore, the output data after application of an activation function may be smaller in size, and hence have lower storage requirements, and may be transferred with a reduced bandwidth.

Referring back to the example in FIG. 1, the convolutional layer 120 may involve the convolution of 64 different kernels with the image data 110 of the first layer. Each of the 64 kernels is for example arranged to identify a different respective feature of the image data. In the example of FIG. 1, whereby the CNN is used to identify animals from photos, the 64 kernels of convolutional layer 120 may be used to identify features such as lines, curves, edges etc. Further convolutional layers, such as 140, may be used to identify more sophisticated features, based on the combined features of those identified in the previous layer 120 e.g. trunk, paws, beak, mane etc. Therefore, as the image data 110 is processed by the CNN 100, different kernels will be activated depending on which features are identified. The fully connected layer 160 may then use the features identified by the kernels to classify the input image 110 into various outputs e.g. elephant 170a, tiger 170b, swan 170c, horse 170d.

In the example of FIG. 1, in which the image data is 224 by 224 pixels, with 3 colour channels, and is convolved with 64 kernels of a size of 3 by 3 pixels, the convolutional layer 120 of the CNN 100 involves 224×224×3×(3×3)×64 multiply-accumulate operations, i.e. 86 million multiply-accumulate operations. There will also be a large number of further multiply-accumulate operations associated with further convolutional layers 140 of the CNN 100, which involve convolving the output of the previous layer 130 with e.g. 256 kernels. As will be appreciated, though, other neural networks may involve convolutions with a different number of kernels. Nevertheless, classification of an image using a neural network typically involves a large number of data processing operations, each of which consumes power. Reduction of the number of data processing operations, while still retaining the same classification accuracy and efficiency, may save processing power.

FIG. 3 is a schematic representation of examples of data to be processed. FIG. 3a shows a first data portion, which in this example comprises image data, in the form of a first frame 110. The first frame 110 may be representative of a frame of video data that makes up a video. In a video, there is a sequence of frames, and the first frame 110 is an exemplary frame that may be any given frame in the sequence (other than the final frame). A region 111 of the first frame 110 is shown within the dashed lines. In this example, the region 111 is a 3×3 pixel region of the first frame 110.

FIG. 3b shows a second data portion, which in this example comprises image data, in the form of a second frame 320. The second frame 320 may also be representative of a frame of video data that makes up a video. The second frame 320 is an exemplary frame that comes immediately after the first frame 110 in the video sequence. A region 321 of the second frame 320 is shown within the dotted lines. In this example, the region 321 is also a 3×3 pixel region of the second frame.

The region 111 of the first frame 110 may be a first input to the CNN. As such, the first 3×3 pixel region 111 may be processed through a convolutional layer e.g. 120. As described in FIG. 2, the first region may be convolved with a kernel 120, accumulated 220 to generate an input 225 to an activation function 225, whereby the activation function 230 can then be evaluated and a first output 235 generated. Similarly, the region 321 of the second frame 320 may be a second input to the CNN. The second 3×3 pixel region 321 may be processed in an identical way through the convolutional layer 120 to generate a second output. The first output and the second output are intrinsically dependent on the first input and second input to the activation function 225, and as such, the characteristics (i.e. features) of the first region of the first frame and the second region of the first frame and the second frame, respectively.

In an example, video data may comprise two consecutive frames (e.g. a first frame 110 and a second frame 320) whereby the second image data (or region of second image data) of the second frame is the same as the first image data (or region of first image data) of the first frame. In such cases, the first output or feature map of a particular kernel for the first image data will be the same as the second output or feature map of the same particular kernel for the second image data.

In this example, the first region 111 of the first frame 110 corresponds to the second region 321 of the second frame 320. The first and second regions 111, 321 of the first and second frame 110, 320 may each contain the same content, such as the same patch of sky. For example, these regions may remain constant or the same across the plurality of frames.

In view of this, the second region 321 of the second frame 320 may be substantially the same as the first region 111 of the first frame 110. Regions of two different frames may be considered to be substantially the same where they are identical. For example, the frames include pixels with identical pixel values (such as identical pixel intensity values). In other cases, regions of two different frames may be considered to be substantially the same where they are similar or the same within a certain tolerance. For example, where a difference between regions of two different frames is less than a difference of 1%, 5%, 10%, 15% or even 20%, or more, these regions may be considered to be substantially the same.

Hence, the first output data (which is obtained from processing of the first frame) may be used to represent the second output data, rather than processing the second region of the second frame. This may therefore reduce the amount of processing compared with processing each frame in its entirety, regardless of its similarity to a previous frame. Consequently, this may improve the efficiency and reduce the power consumption of the CNN. Furthermore, the latency (or the time taken) in processing a frame may be reduced.

FIG. 4 is a schematic representation of examples of an activation function 410, 420. FIG. 4a shows an example activation function 410 e.g. a sigmoid function. An input 411 to the activation function 410 generates an output 412. In this illustrative example, the slightly negative value 411, when evaluated for the activation function, generates an output value 412 of slightly more than zero. Another input 413, when evaluated for the activation function 410, generates another output 414 of just less than one. A small modification in input value (from slightly-negative input 411 to slightly-positive input 413) generates a large change in output value (from just more than zero to just less than one). In such a scenario, a small modification of the input value to the activation function may generate a large modification to the output value. This results when the derivative of the activation function is non-zero or non-negligible at the point where the input is evaluated. In other words, a small modification to the image data (that generates the input value after the image data is processed through the kernel) may generate a large modification to the output of the activation function.

FIG. 4b shows the same activation function 420 but with different input values 415, 416. Input 415 generates a zero-value output for the activation function. By modifying the input value from 415 to 416, the output of the activation function does not change i.e. the output is still zero. This results when the derivative of the activation function is zero or negligible at the point where the inputs are evaluated. In other words, a much larger change than the change in input value from 415 to 416 is required to change the output of the activation function.

Similarly, input 417 generates an output of one for the activation function. Modifying the input values from 417 to 418 does not change the output from the activation function i.e. the output is still one. This again results because the derivative of the activation function is zero or negligible where the inputs are evaluated for the activation function. A much larger change than the change in input value from 417 to 418 is required to change the output of the activation function.

Referring back to the example of video data comprising two consecutive frames (e.g. a first frame 100 and a second frame 320). The first frame may generate a first input e.g. 415 which generates an output from the activation function of zero. In order for an output from the activation function to be non-zero for a second input of the second frame, a large change may be required.

By identifying a first input (of a first frame) that would require a significant modification to a second input (of a second frame) in order to generate a different output from the activation function, the processing of the CNN may be reduced. If the first output of the activation function is known (e.g. zero or one) and a second input does not change significantly, then the second output from the activation function is easily determined i.e. it will be the same as the first output.

In order to compare the first image data with the second image data (to determine if a change has occurred), a first signature for the first image data and a second signature for the second image data are generated. The first signature and the second signature are characteristic of the first image data and second image data, respectively, and allow the image data to be easily compared. If the first and second signatures are determined to be the same (or similar) then the first image data and the second image data are determined to also be the same (or similar). Therefore, for first image data where a significant change is required to generate a different output from the activation function, the second output generated by the second image data will be the same as the first output. As a result, the second image data may not need to be processed by a convolutional layer, which involves the computational-intensive multiply-accumulate process of executing the kernels. Instead, the second output from the activation function (i.e. the feature map from the convolutional layer) may be determined to be the same as the first output.

Figure 5:
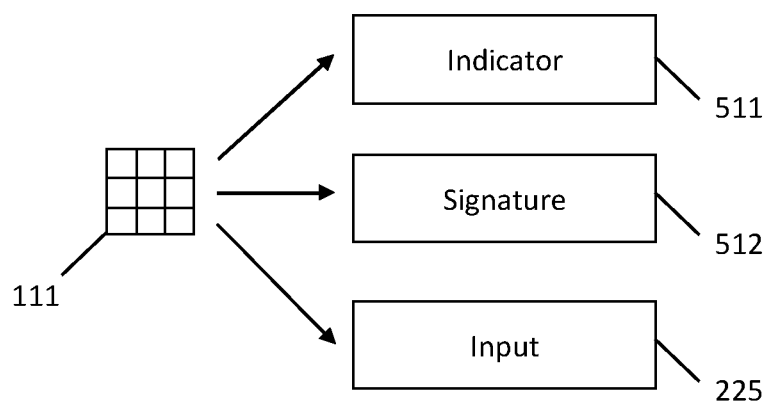
FIG. 5 is a schematic representation of a region of image data.

FIG. 5 is a schematic representation of a region 111 of image data 110. According to some examples of the method described herein, a data portion may comprise image data. As described in relation to FIG. 2, the first image data region 111 of a frame may be processed by a convolutional layer 120 to generate a first input 225 to an activation function 230. From the first input 225, an indicator 511 may be generated that is representative of the first input 225. The indicator may be used to indicate whether a significant change would be required for a second input of a subsequent second image data region 321 in order to generate a different output for the activation function.

In some examples, the indicator is derived from the first input, using a derivation function that is different from the activation function. The derivation function may comprise a threshold function. The derivation function may be evaluated for the first input, and if the output is, for example, below a pre-determined threshold, then the indicator may be stored as '0'. For example, the derivative of the activation function, evaluated for the first input, is determined to be a zero or negligible value, and the indicator is stored as '0'. On the other hand, if the output is, for example, above a pre-determined threshold, then the indicator is stored as '1'. For example, the derivative of the activation function, evaluated for the first input, is determined to be a non-zero or non-negligible value, and the indicator is stored as '1'.

In some examples, the indicator may comprise at least one binary digit. For each region of 111 of the image data 110 to be evaluated by a kernel, at least one binary digit may be generated. As such, for the complete image data 110, a grid of at least one binary digits or a bitmap may be generated. A bitmap may be generated for each kernel of a convolutional layer.

In some examples, a bitmap is generated for the image data of the input layer 110. In other examples, a bitmap is generated for image data of a subsequent layer of the CNN i.e. for a feature map 130a-b that is input to a convolution layer 140.

A first image data region 111 may also generate a signature 512. A signature is for example any data which is representative of a content of image data. For example, a signature may be obtained by applying a hashing algorithm to the image data. A hashing algorithm is for example a one-way algorithm in which an output (referred to as a hash) is deterministic such that the application of the hashing algorithm again to exactly the same input data will produce the same hash. The algorithm is one-way in that the original input data cannot be recovered from the hash alone, even with full knowledge of the hashing algorithm. A hash may be of a fixed length, which may be relatively small, and smaller than the image data representative of the frame itself. In this way, the first and second signatures may represent the first and second image data in a manner which is efficient in terms of storage requirements and processing use.

If the first and second signatures are determined to be sufficiently similar, for example having a relationship falling within a pre-determined bound, the first image data of the first frame may be written to storage so that it may be re-used for the subsequent (second, third, fourth etc.) frames if appropriate.

Other signatures or characteristics may be used to represent a content of the first and second image data. In some examples, the signature 512 of the image data region 111 may be a check value generated by a cyclic redundancy check (CRC). In some examples, the signature 512 of the image data region 111 may be a most significant bit signature and/or a least significant bit signature.

The most significant bit may be considered to be the highest bit in a series of numbers that correspond to binary notation. For example, if the value of a binary number was '11101110' i.e. 8-bit input data, then the most significant bit would be the number '1' on the far left i.e. bit [7]. The least significant bit may be considered to be the lowest bit in a series of numbers that correspond to binary notation. In the same example of the binary number '11101110', the least significant bit would be the number '0' on the far right i.e. bit [0]. In an illustrative example for image data, each colour channel (e.g. red, green, blue or RGB) may take a value from '0' to '255' in decimal notation or '00000000' to '11111111' in binary notation. As such, a blue (B) colour channel may take the value of '238' in decimal notation or '11101110' (i.e. B[7:0]) in binary notation for the first image data. In the second image data, the blue colour channel may have changed to '239' in decimal notation or '11101111' in binary notation. As such, the most significant bit B[7] for the first image data has remained the same, but the least significant bit B[0] has changed from '0' to '1'. If, however, the blue colour channel in the second image data changed to '110' in decimal notation or '01101110' in binary notation, then the most significant bit B[7] has changed from '1' to '0' and the least significant bit B[0] has remained the same.

In some examples, a signature may be representative of a part of the image data. For example, image data with three (RGB) colour channels may comprise 8-bit image data represented as R[7:0], G[7:0] and B[7:0], whereby each 8-bit colour channel may comprise an upper part, a middle part and a lower part of the image data. The most significant bits signature may represent an upper part of the image data e.g. R[7:5], G[7:5] and B[7:5]. A middle bits signature may represent a middle part of the image data e.g. R[4:3], G[4:3] and B[4:3]. A least significant bits signature may represent a lower part of the image data e.g. R[2:0], G[2:0] and B[2:0].

In the same illustrative example as above, the blue colour channel of the first image data is '238' or '11101110'. In the second image data, the blue colour channel of the second image data is '239' or 11101111'. Therefore, the most significant bits signature B[7:5] and the middle bits signature B[4:3] have not changed, but the least significant bits signature of the lower part of the image data B[2:0] has changed. The signature 512 is characteristic of the image data region 111. In some examples, a single signature is generated for the image data region, regardless of the number of channels of the image data. For example, a most significant bits signature representing the upper part of all three (RGB) colour channels of the image data may be generated. Similarly, a middle bits signature bits signature representing the middle part of all three (RGB) colour channels of the image data may be generated. In other examples, a signature may be generated for each RGB colour channel individually. For example, a least significant bits signature representing the lower part of each RGB colour channel may be generated individually. The signature 512 for the image data region 111 may be used to efficiently determine if the image data region has changed from one frame to the next.

In some examples, a first signature for the first image data may comprise a most significant bit signature and a second signature for the second image data may also comprise a most significant bit signature. If, upon comparison of the first signature with the second signature, the signatures are the same, the second image data is determined to be the same as the first image data. As such, the second image data does not need to be processed, and the second output can be set to equal the first output. If, upon comparison, the second image data is determined to be different to the first image data, the second image data may need to be processed to determine the second output.

In some examples, a difference between a first signature representative of first image data and a second signature representative of second image data below a certain threshold may be acceptable. The threshold may be determined by properties of a kernel of the convolutional layer that is processing the image data. The properties of the kernel such as the weights of the kernel, may be used to calculate how much the second image data is required to change before it needs be processed by the kernel of the convolutional layer.

For example, a first least significant bits signature representative of a lower part of first image data for a blue colour channel i.e. B[2:0] has a maximum change of +/−7. Therefore, if the weight of a kernel is −10, then the maximum negative change is −10*7=−70. Similarly, if the weight of a different kernel is +50, then the maximum positive change is 50*7=+350. If the first input into the activation function for the first image data is −1000, then the most negative value the second image data could be is −1000−70=−1070. Similarly, the most positive value the second image data could change to be is −1000+350=−650. In examples where the activation function is a ReLU function, the second image data will still be a negative input value and will therefore result in a zero output from the activation function. Thus, the second image data will not need to be processed. If instead the first input into the activation function for the first image data is −200, then the most negative value the second image data could be is −200−70=−270. Similarly, the most positive value the second image data could be is −200+350=+150. As such, the second image data may change to a positive input value when processed by the kernel and may therefore result in a non-zero output from the activation function. Therefore, the second image data may need to be processed to determine the second output.

In the above illustrative example, the activation function is a ReLU function but other activation functions may be used. For a different activation function, a zero output may be produced from a different range of input values (compared to the negative input values that produce a zero output for the ReLU function). As such, the properties of the activation function may also be used to calculate how much the second image data is required to change before it needs to be processed by the kernel of the convolutional layer.

In the illustrative example described above, the kernels have the dimensions of 1×1×1 in order to simplify the description. However, kernels with other dimensions may often be used. For example, a kernel may have the dimensions of 2×2×3 or 3×3×3, whereby the last dimension is for each of the three colour channels, RGB.

In some examples, the probability that the second image data may change the output of the activation function may be calculated. Using the first input to the activation function for the first image data and the maximum change that is possible from the weight(s) of a kernel, the probability that the second input to the activation function would change the output of the activation function may be calculated. As such, the probability may be evaluated with respective to an evaluation threshold to determine whether or not the second image data needs to be processes to determine the second output. If the probability is below the evaluation threshold, it may be determined to not process the second image data. If the probability is above the evaluation threshold, it may be determined to process the second image data to determine the second output from the activation function.

FIG. 6 is a block diagram of a method 600 of processing a data portion. In block 610, the method 600 processes a first data portion in a CNN to generate a first input to an activation function in the CNN. In some examples, the first frame comprises first image data corresponding to a first image frame. In some examples, the first data portion may comprise a plurality of regions of the first data portion.

In some examples, the method 600 may further process the first data portion to generate a first signature representative of the first image data. The signature may be at least one of a most significant bit signature and a least significant bit signature.

In block 620, the method 600 provides a first output by applying the activation function to the first input. The first output from the activation function may be stored in memory.

In block 630, the method 600 stores an indicator, representative of the first input to the activation function, for the first data portion. In examples wherein the first data portion comprises a plurality of regions of the first data portion, storing an indicator may comprise storing a plurality of indicators for the plurality of regions of the first data portion. In other words, for each region of the plurality of regions processes, an indicator is stored that is associated with said region.

In some examples, the indicator comprises at least one binary digit. Storing the indicator may comprise setting the at least one binary digit in a bitmap, comprising a plurality of binary digits, associated with the plurality of indicators. Therefore, a bitmap may be stored wherein each binary digit of the bitmap is associated with a region of the plurality of regions of the first data portion.

If, for example, the first data portion generates a first input value close to zero, the output from the activation function may be between zero and one. As such, the indicator may be stored as '1'. This indicates that only a small change in the second data portion may generate a significantly different output from the activation function. Hence, the second output may have to be provided, by applying the activation function to a second input generated from the second data portion.

If, for example, the first data portion generates a significantly negative input value, the output from the activation function may be zero. As such, the indicator may be stored as '0'. This indicates that a significant change in second data portion (and hence second input value and second output) is needed generate an output from the activation function that is not zero. Hence, the second output may not have to be provided, and instead the second output value, known to be equal to the first output data, can be deduced.

In block 640, the method 600 determines whether to provide a second output by applying the activation function to a second input, generated from the second data portion, based at least in part on an evaluation of the indicator for the first data portion. In some examples, the second data portion comprises second image data corresponding to a second image frame. Evaluating the indicator of the first data portion determines whether to provide the second output by applying the activation function to the second input or whether to not provide the second output i.e. use the first output instead. In other words, evaluating the indicator for the first data portion determines if a change to the first input to the activation function is likely to generate a different output to the activation function for a subsequent second data portion.

If, for example, the indicator is evaluated as '1', it may be determined to provide a second output by applying the activation function to a second input. The indicator indicates that only a small change in the second data portion is required to generate a different output from the first data portion. Therefore, it is determined to process the second data portion to generate a second output. The second data portion will be processed by the kernel to generate a second input to the activation function, and the activation function will be evaluated with the second input to generate a second output from the activation function. In other words, the second data portion will be processed through the convolutional layer of the CNN.

If, for example, the indicator is evaluated as '0', it may be determined to not provide a second output by applying the activation function to a second input. The indicator indicates that a significant change in the second data portion is required to generate a different output from the first data portion. As such, if the second data portion is determined to be similar to the first data portion, the second data portion will not need to be processed though the convolutional layer of the CNN.

In some examples, the method 600 may further process the second data portion to generate a second signature representative of the second data portion. The signature may be at least one of a most significant bit signature and a least significant bit signature.

In some examples, the first signature may be compared with the second signature. Performing the determining of whether to provide a second output by applying the activation function to the second input may be based at least in part of the comparison of the first signature with the second signature.

If, for example, the first signature and the second signature have a relationship that falls within a bound which is derived from the indicator, then it is determined to not provide a second output by applying the activation function to the second input. In other words, the second data portion is determined to be within the bound of the first data portion. As a result, the second data portion will not be processed: the convolutional layer will not be executed for the second data portion i.e. the kernels will not be executed, the input will not be generated, and the second output from the activation function will not be provided. Instead, the second output data from the activation function is known to be equal to the first output data from the activation function and can therefore be deduced. This therefore avoids processing the convolutional layer unnecessarily, saving processing power and time.

In some examples, upon determining to not provide the second output by applying the activation function to the second input, the first output from the activation function is retrieved from memory and the second output from the activation function is assigned as equal to the first output from the activation function.

If, for example, the first signature and the second signature have a relationship that falls outside the bound, then it is determined to provide a second output by applying the activation function to the second input. In other words, the second data portion is significantly different to the first data portion. Therefore, the second data portion will be processed: the convolutional layer will be executed for the second data portion i.e. the kernels will be executed, the input will be generated, and the second output from the activation function will be provided.

In some examples, processing the first data portion in the CNN comprises evaluating at least one kernel in a convolutional layer of the CNN. In such cases, at least one indicator, associated with at least one kernel in the convolutional layer of the CNN, is generated.

In some examples, the data portion may not be the input data 110 into a convolutional layer 120 of the CNN. Instead, the data portion may be an input feature map e.g. 130a-c (outputted from a previous layer e.g. 130) into another convolutional layer 140 of the CNN.

In some examples, the first data portion may comprise a first section of the first data portion and a second section of the first data portion. In such cases, processing the first data portion may comprise alternating between processing the first section of the first data portion and the second section of the first data portion.

Figure 7:
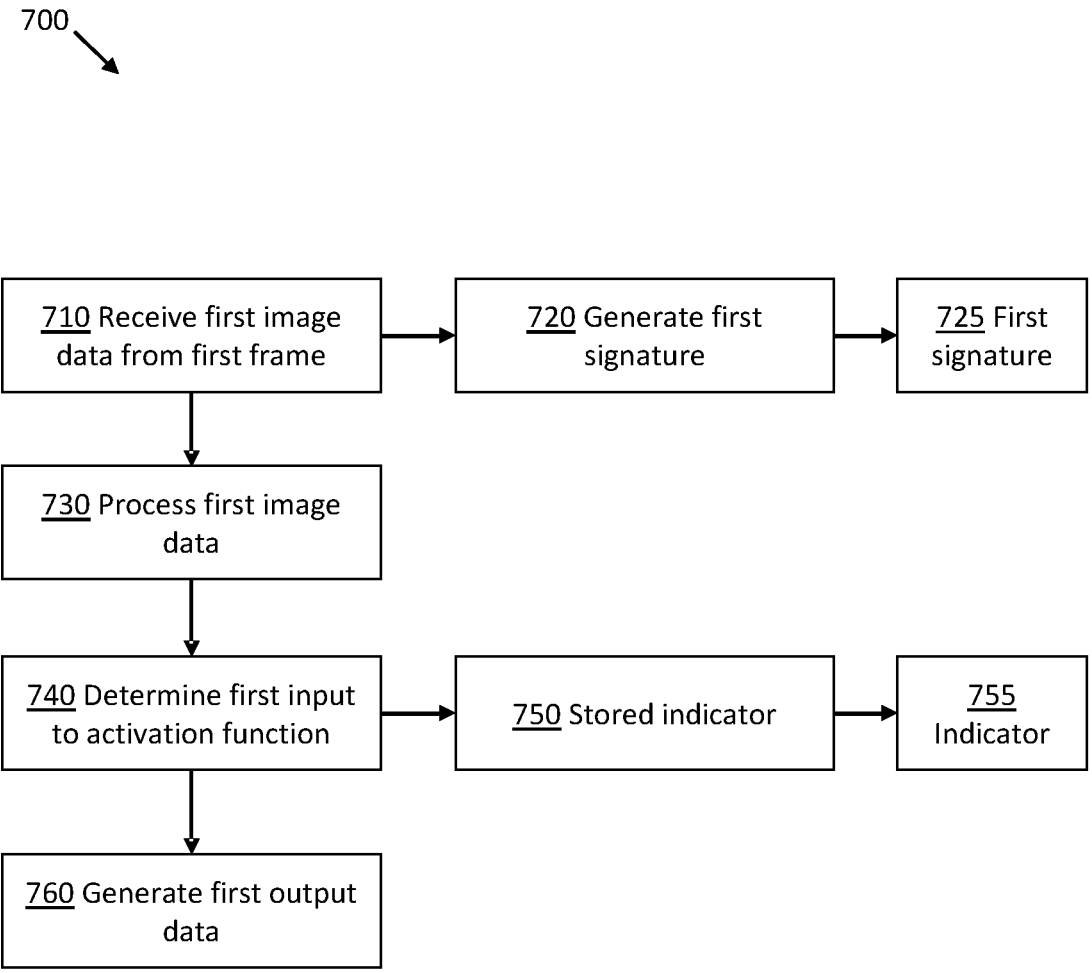
FIG. 7 is a flowchart showing a method of processing image data associated with a first frame.

FIG. 7 is a flowchart 700 showing a method of processing image data associated with a first image frame. According to some examples of the method described herein, the data portion may comprise image data corresponding to an image frame.

In some examples, the data portion may be input data to the first layer of the CNN. In other examples, the data portion may be an input feature map, derived from the input data, to an intermediate layer of the CNN.

In step 710 of the flowchart 700, first image data is received from the first frame. The first image data may be a region of the first frame.

In step 720, a first signature 725 is generated from the first image data. In some examples, the first signature is stored in memory. The signature may be at least one of a most significant bit signature and a least significant bit signature.

In step 730, the first image data is processed. Processing of the first image data may comprise executing a kernel to generate a first input value for an activation function. In some examples, processing the first image data may comprises executing at least one kernel in a convolutional layer of the CNN to generate at least one first input value for the activation function.

In step 740, the first input to the activation function is determined. In step 750, an indicator 755 is stored based on the first input. The value of the indicator is representative of the first input to the activation function. In some examples, the indicator may a binary digit e.g. '0' or '1'. In further examples, the indicator may be more than one binary digit e.g. '00', '01', '10' or '11'. The indicator may indicate a bound for comparison of the first signature and second signature (as described later).

For example, the indicator may be stored as '0' to indicate the first input is either significantly negative (i.e. generates zero when evaluated with the activation function) or significantly positive (i.e. generates one when evaluated with the activation function). The indicator may be stored as '1' to indicate the first input generates a value between zero and one when evaluated with the activation function. In some examples, the indicator is stored in memory.

In some examples, the first image data may comprise a plurality of regions of the first image data. In such cases, a plurality of indicators are generated, wherein each indicator is associated with a region of the image data.

In further examples, an indicator may comprise a binary digit. As such, a plurality of binary digits, wherein each binary digit is associated with a region of the image data, may form a bitmap.

In step 760, a first output from the activation function is generated by evaluating the activation function with the first input. In some examples, the first output is stored in memory.

Figure 8:
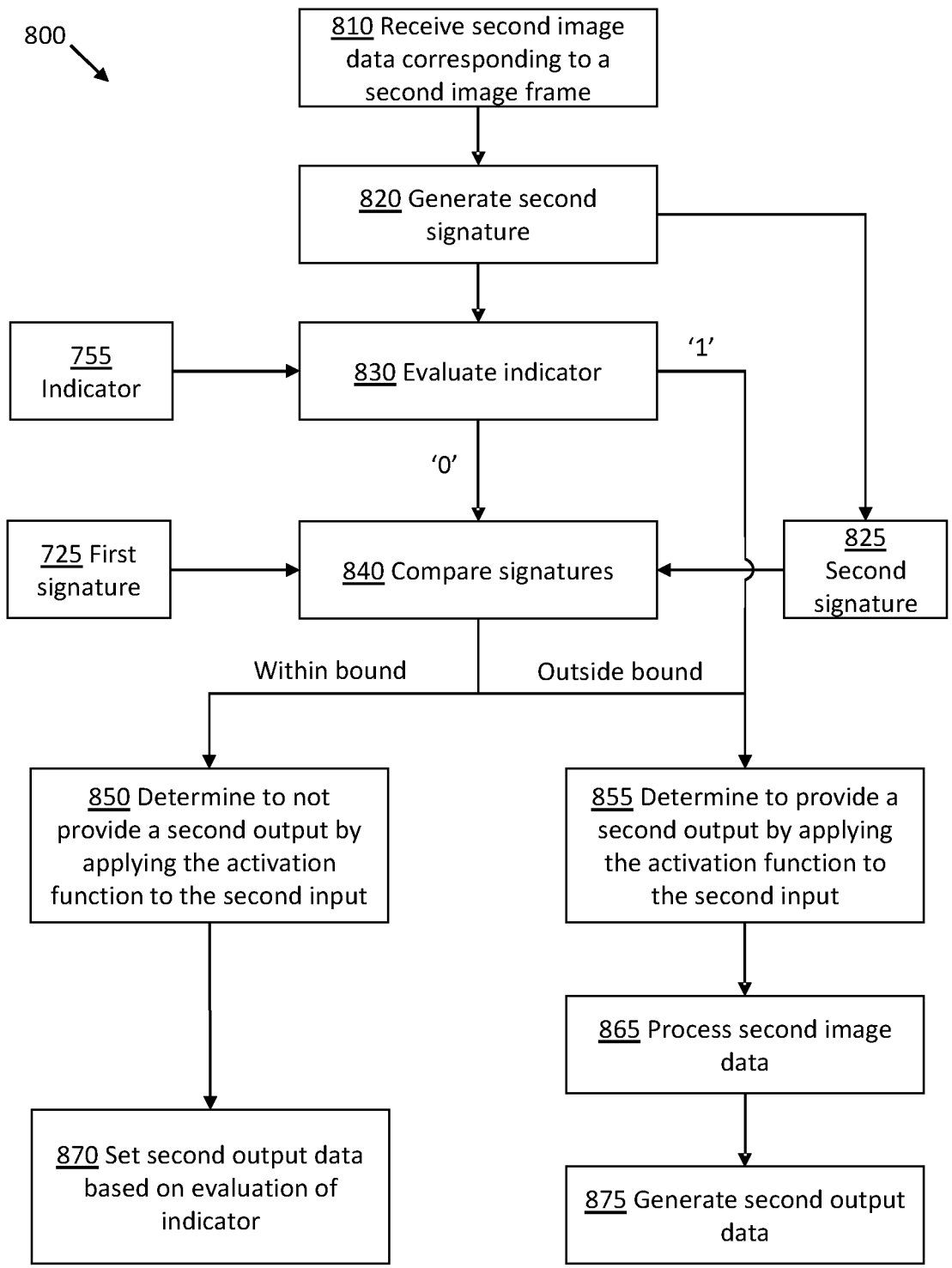
FIG. 8 is a flowchart showing a method of processing image data associated with a second frame.

FIG. 8 is a flowchart 800 showing a method of processing image data associated with a second image frame. According to some examples of the method described herein, the data portion may comprise image data corresponding to an image frame.

In some examples, the data portion may be input data to the first layer of the CNN. In other examples, the data portion may be an input feature map, derived from the input data, to an intermediate layer of the CNN.

In step 810 of the flowchart 800, second image data, corresponding to a second image frame, is received. The second image data may be a region of the second frame.

In step 820, a second signature is generated from the second image data. In some examples, the second signature is stored in memory. The signature may be at least one of a most significant bit signature and a least significant bit signature. The second signature that is generated will be an equivalent signature to the first signature that is generated i.e. if the first signature is a most significant bit signature, then the second signature will be a most significant bit signature.

In step 830, the indicator 755 is evaluated. In some examples, the indicator may be a binary digit e.g. '0' or '1'. If the indicator is evaluated as '1', then this indicates that the second image data is required to be processed, as even a small change from the first image data to the second image data may generate a significantly different output from the activation function. In such a case, the method follows a path to step 855 where it is determined to provide a second output by applying the activation function to a second input. In other words, by processing the second image data by multiplying the second image data by the kernel weights, accumulating, and adding a bias to generate a second input. The activation function is then applying to the second input to provide a second output.

If the indicator is evaluated as '0', then this indicates that the second image data may not be required to be evaluated, as a significant change from the first image data to the second image data is needed to generate a different output from the activation function. In such a case, to determine how different the first and second image data are, the method follows a path to step 840.

In step 840, the first signature 725 and the second signature 825 are compared to determine if the first signature 725 and the second signature 825 have a relationship that falls within a bound which is derived from the indicator. The bound may comprise a pre-determined value.

If the difference between the first signature 725 and the second signature 825 is less than the pre-determined value, the relationship falls within the bound. This results in a determination to not provide the second output by applying the activation function to the second input, and the method 800 follows a path to step 850. In other words, the second image data is the same or similar to the first image data. Therefore, the second image data is not required to be processed by a convolutional layer of the CNN. Instead, the first image data, that has already been processed by the convolutional layer, to generate a first output from the activation function, can be used.

In step 870, the second output from the activation function is set based on the evaluation of the indicator. As a result, the second output from the activation function is determined, without having to process the second image data.

In some examples, evaluation of the indicator may determine that the first input to the activation function was a significantly negative value, for example one which is beyond a negative threshold. As a result, the first output from the activation function may be zero. In such cases, the first output from the activation function is not retrieved. Instead, the second output from the activation function is set as zero.

In some examples, evaluation of the indicator may determine that the first input to the activation function was a significantly positive value, for example one which is beyond a positive threshold. As a result, the first output from the activation function may be one. In such cases, the first output from the activation function is not retrieved. Instead, the second output from the activation function is set as one.

If the difference between the first signature 725 and the second signature 825 is greater than the pre-determined value, the relationship falls outside the bound. This results in a determination to provide the second by applying the activation function to the second input, and the method 800 follows a path to step 855 i.e. process the second image data as normal. In other words, the second image data is different to the first image data. Therefore, the second image data is required to be processed by the convolutional layer of the CNN, in order to generate a second output from the activation function.

In some examples, more than one signature is generated e.g. a most significant bit signature and a least significant bit signature, for both the first image data and second image data. In such cases, the indicator for the first image data may be more than one binary digit e.g. '00', '01', '10' or '11'. Evaluating the indicator may determine which signatures (if any) to compare for the first image data and the second image data. For example, the indicator may be evaluated as '11' which may determine to not compare signatures i.e. to process the second image data to provide a second output by applying the activation function to the second input. The indicator may be evaluated as '10' which may determine that the first least significant bit signature and the second least significant bit signature are to be compared. The indicator may be evaluated as '01' which may determine that the first most significant bit signature and the second most significant bit signature are to be compared. Finally, the indicator may be evaluated as '00' which may determine that the first most significant bit signature and the second most significant bit signature are to be compared and the first least significant bit signature and the second least significant bit signature are to be compared.

In step 865, the second image data is processed by the convolutional layer in the CNN. In step 875, the second output from the activation data is generated. As a result, the second output from the activation is determined.

Figure 9:
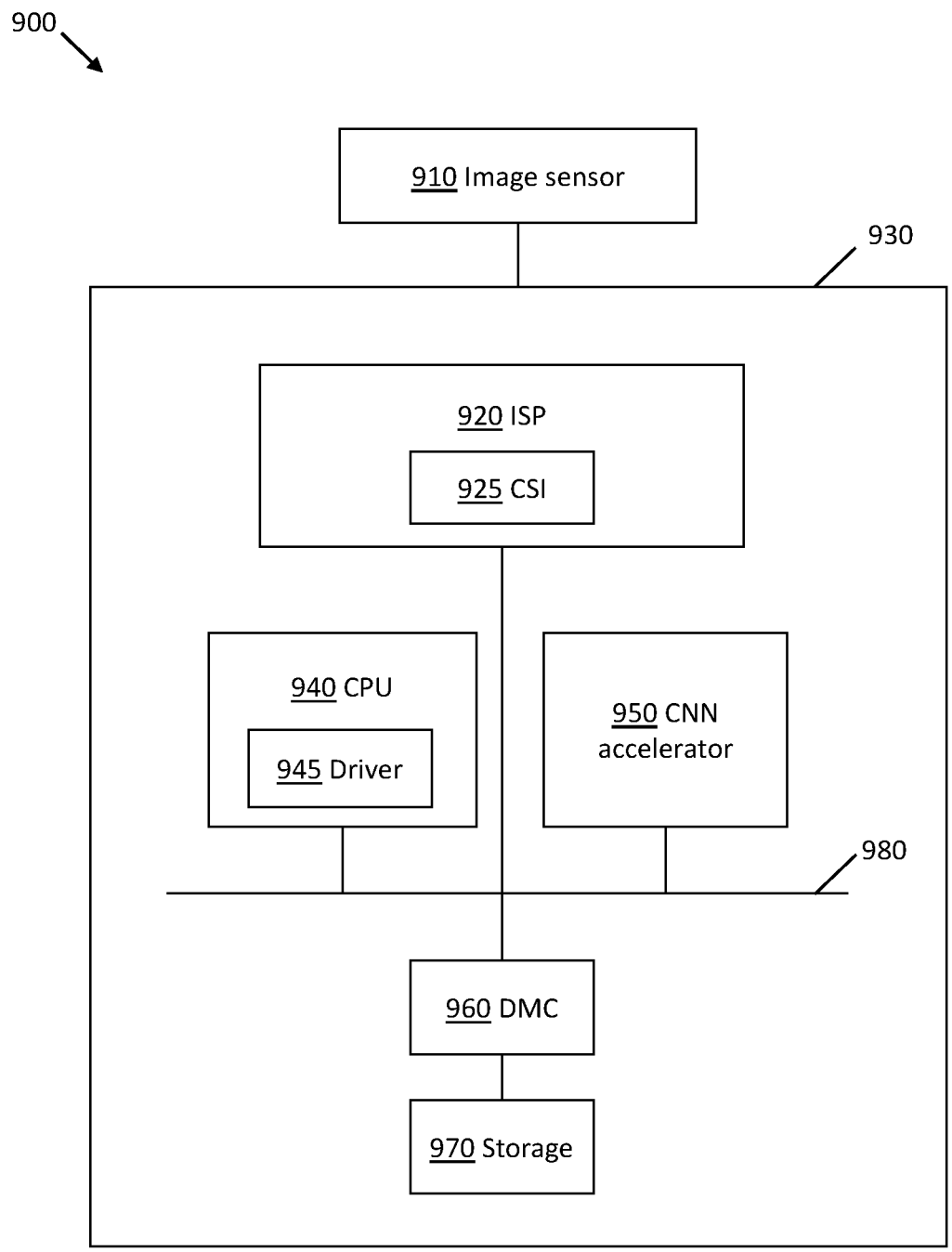
FIG. 9 is a schematic representation of a system for processing image data.

FIG. 9 is a schematic representation of a system 900 for processing image data for use with the methods described herein. The image processing system 900 of FIG. 9 may be coupled to or form part of a computer device, such as a personal computer, a laptop, a smartphone or an on-board computer device which may be coupled to or mounted within a vehicle such as a car.

The image processing system 900 includes an image sensor 910. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). The image sensor 174 in this example is arranged to capture image data, which may be in the form of a series of images captured sequentially, with each image corresponding to a frame of a video.

In FIG. 9, the image sensor 910 is arranged to transfer image data to an image signal processor (ISP) 920 of a computing system 930 via a camera serial interface (CSI) 925. The ISP 920 may perform initial processing of image data (such as individual frames of the video) to prepare the video for display. For example, the ISP 920 may perform saturation correction, renormalization, white balance adjustment and/or demosaicing, although this is not to be taken as limiting.

The computing system 930 includes at least one processor. The at least one processor is for example configured to perform the methods described herein. In this example, the computing system 930 includes a central processor unit (CPU) 940. The computing system 930 also includes a neural network accelerator 950, which is a processor dedicated to implementing at least classification of data using a neural network. For example, the neural network accelerator 950 may be configured to implement a neural network such as the CNN described above. In other examples, though, the processing of image data to generate a signature representative of the image data, which may include a neural network, may be implemented using a more general processor, such as the CPU or a GPU.

In other examples, though, the computing system 930 may include other or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The computing system may also or alternatively include a processor implemented as a combination of computing devices, e.g., a combination of a DSP and a microprocessor, a plurality of microprocessors, one or more microprocessors in conjunction with a DSP core, or any other such configuration. The computing system may also or alternatively include at least one graphics processing unit (GPU).

The CPU 940 of FIG. 9 includes a driver 945 which for example provides an interface between software configured to control or configure the neural network and the neural network accelerator 950, which is configured to perform the processing to implement the neural network. The driver 945 may therefore form part of or correspond to a control system for controlling the operation of the at least one processor.

The computing system 930 of FIG. 9 also includes a dynamic memory controller (DMC) 960 which may be used to control access to storage 970 of the computing system 930. The storage 970 is for example configured to store the image data received from the ISP 920.

The storage 970 is for example external to the neural network accelerator 950 and may be a random access memory (RAM) such as DDR-SDRAM (double data rate synchronous dynamic random access memory). In other examples, the storage 970 may be or include a non-volatile memory such as Read Only Memory (ROM) or a solid state drive (SSD) such as Flash memory. The storage 970 in examples may include further storage devices, for example magnetic, optical or tape media, compact disc (CD), digital versatile disc (DVD) or other data storage media. The storage 970 may be removable or non-removable from the computing system 930. In examples, the neural network 950 may also include local storage, which may nevertheless be considered to form part of the storage of the image processing system 900.

The components of the computing system 930 in the example of FIG. 9 are interconnected using a systems bus 980. This allows data to be transferred between the various components. The bus 199802 may be or include any suitable interface or bus. For example, an ARM® Advanced Microcontroller Bus Architecture (AMBA®) interface, such as the Advanced eXtensible Interface (AXI), may be used.

The at least one processor, for example the processor of the neural network accelerator 950, may be configured to process first image data, corresponding to a first image frame, in a CNN to generate a first input to an activation function in the CNN.

The at least one processor, for example the processor of the ISP 920, may be configured to process first image data to generate a first signature representative of the first image data. In such cases, the ISP 920 may itself include storage, such as one or more buffers for temporary storage of the first image data and the first signature.

The at least one processor, for example the processor of the neural network accelerator 950, may be configured to provide a first output by applying the activation function to the first input.

The at least one processor, for example the processor of the ISP 920, may be configured to store an indicator, representative of the first input to the activation function, for the first image data.

The at least one processor, for example the processor of the ISP 920, may be configured to process second image data, corresponding to a second image frame, to generate a second signature representative of the second image data. In such cases, the ISP 920 may itself include storage, such as one or more buffers for temporary storage of the second image data and the second signature.

The at least one processor, for example the processor of the ISP 920, may be configured to compare the first signature with the second signature based at least in part on an evaluation of the indicator for the first image data. In this way, further processing of the second image data may be avoided if it is determined that the second image data is the same or similar to the first image data.

The at least one processor, for example the processor of the ISP 920 or the processor of the neural network accelerator 184, may be configured to determine whether to provide a second output by applying the activation function to a second input, generated from the second image data, based at least in part on the evaluation of the indicator for the first image data. In examples where the first signature and the second signature have a relationship which falls within a bound, which is derived from the indictor, the processor of the ISP 920 may retrieve the first output data from storage and assign the second output as equal to the first output. In examples where the first signature and the second signature have a relationship which falls outside the bound, the processor of the neural network accelerator 950 may process the second image data to generate second output data. The storage may be the storage 970 (which is for example system storage or a main memory) or local storage accessible to the neural network accelerator 950. In examples in which the neural network accelerator 950 is implemented in hardware, the local storage may be on-chip memory. The local storage may for example be a static random access memory (SRAM), although other memory types are possible.

It is to be appreciated that the image processing system 900 of FIG. 9 is merely an example and other image processing systems may be used in other examples.

Figure 10:
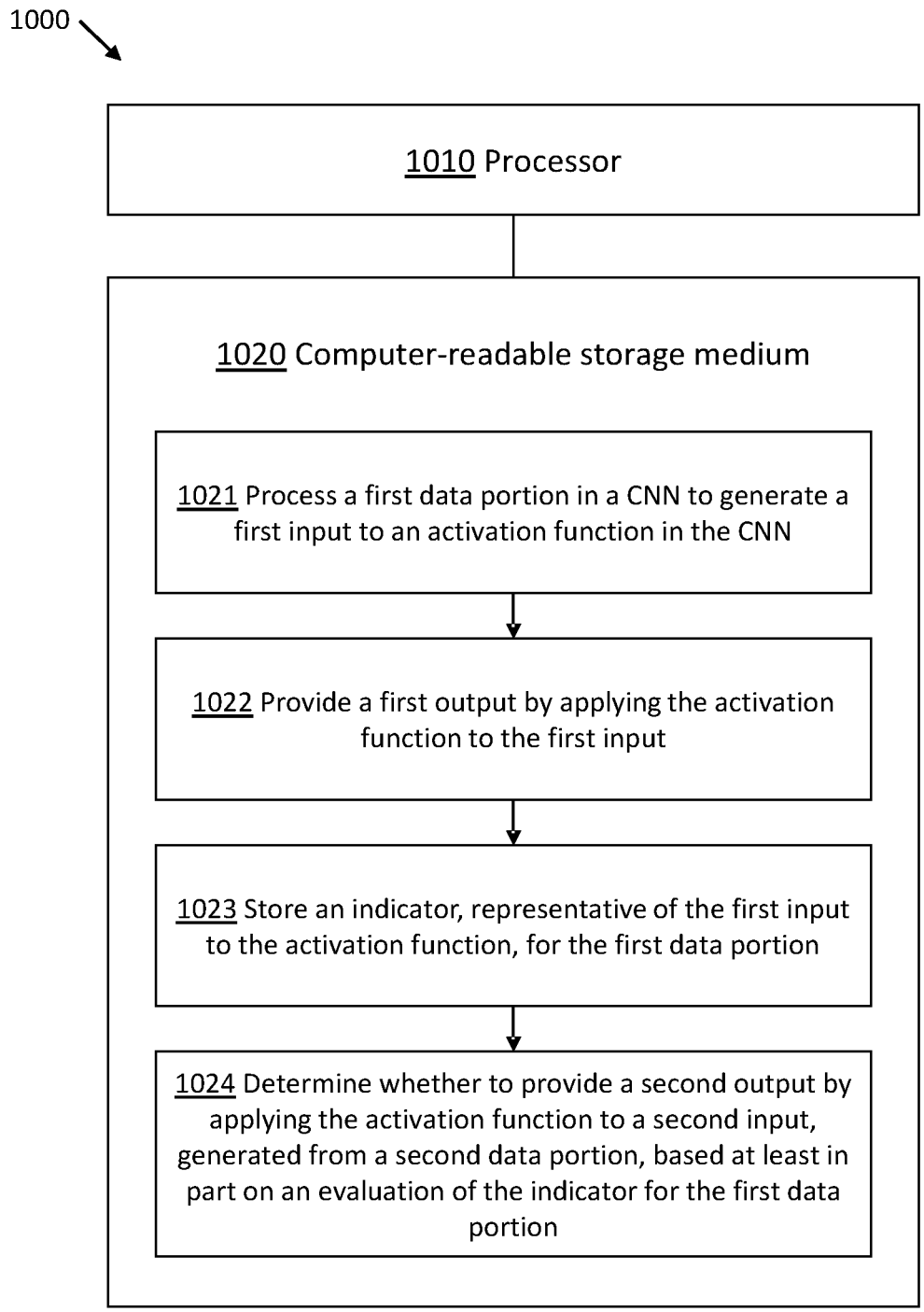
FIG. 10 is a schematic representation of a processor and non-transitory, computer-readable storage medium.

FIG. 10 is a schematic representation 1000 of a processor 1010 and a computer-readable storage medium 1020 containing computer-readable instructions 1021-1024 for processing data which, when executed by at least one processor 1010, cause the at least one processor 1010 to perform a procedure according to examples described herein. The computer readable instructions 1021-1024 may be retrieved from a machine-readable media, for example any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a volatile memory such as a random access memory (RAM), a dynamic random access memory (DRAM), a static random access memory (SRAM) or a fast CPU cache memory, or a non-volatile memory such as a flash memory, a read-only memory (ROM) or an erasable programmable read-only memory (EPROM). Machine-readable media may relate to a primary storage device such as RAM or ROM, or a secondary storage device such as an optical disk, a hard disk drive (HDD), a solid-state drive (SSD) or a solid-state hybrid drive (SSHD).

At block 1021, the instructions cause the processor to process a first data portion in a convolutional neural network to generate a first input to an activation function in the convolutional neural network. At block 1022, the instructions cause the processor to provide a first output by applying the activation function to the first input. At block 1023, the instructions cause the processor to store an indicator, representative of the first input to the activation function, for the first data portion. At block 1024, the instructions cause the processor to determine whether to provide a second output by applying the activation function to a second input, generated from a second data portion, based at least in part on an evaluation of the indicator for the first data portion.

Whilst embodiments described herein relate to a data portion comprising image data, other embodiments are envisaged, for example audio data. An audio track may comprise multiple frames of audio data, whereby each frame contains at least one sample of amplitude information for a specific point in time. A sample contains amplitude information for multiple regions or frequency ranges. During an audio track, consecutive frames of audio data may remain relatively unchanged from frame to frame (or sample to sample). As an illustrative example, if the audio track has been obtained from an audio surveillance microphone, the audio track may contain a background noise for a certain length of time. As a result, regions (i.e. frequency ranges) of a frame may contain amplitude information representative of the background noise. As such, regions of consecutive frames may contain the same amplitude information. Processing audio data, for example to perform a feature detection operation such as noise detection or noise recognition, typically requires a significant amount of computation. However, some of this processing may be redundant if frames (or regions of the frames) of the audio track contain amplitude information that has not changed over time. Application of the method described herein may reduce processing of the data portion comprising, for example, audio data.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A computer-implemented method of processing data, the method comprising:
    processing a first data portion in a convolutional neural network to generate a first input to an activation function in the convolutional neural network;
    providing a first output by applying the activation function to the first input;
    storing an indicator, representative of the first input to the activation function, for the first data portion; and
    determining whether to provide a second output by applying the activation function to a second input, generated from a second data portion based at least in part on an evaluation of the indicator for the first data portion.

2. A method according to claim 1, wherein the indicator is derived from the first input, using a derivation function different than the activation function.

3. A method according to claim 1, further comprising:
    processing the first data portion to generate a first signature representative of the first data portion;
    processing the second data portion to generate a second signature representative of the second data portion;
    comparing the first signature with the second signature; and
    performing said determining based at least in part on the comparison of the first signature with the second signature.

4. A method according to claim 3, further comprising comparing the first signature with the second signature based on the evaluation of the indicator for the first data portion.

5. A method according to claim 3, comprising determining to not provide the second output by applying the activation function to a second input as a result of the first signature and the second signature having a relationship which falls within a bound which is derived from the indicator.

6. A method according to claim 5, further comprising:
    upon determining to not provide the second output by applying the activation function to a second input, setting the second output from the activation function based on the evaluation of the indicator for the first data portion.

7. A method according to claim 3, comprising determining to provide the second output by applying the activation function to a second input as a result of the first signature and the second signature having a relationship which falls outside a bound which is derived from the indicator.

8. A method according to claim 1, wherein processing the first data portion in the convolutional neural network comprises evaluating at least one kernel in a convolutional layer of the convolutional neural network and wherein generating an indicator comprises generating at least one indicator associated with at least one kernel in the convolutional layer of the convolutional neural network.

9. A method according to claim 1, wherein the first data portion comprises a plurality of regions of the first data portion and wherein generating an indicator comprises generating a plurality of indicators for the plurality of regions of the first data portion.

10. A method according to claim 9, wherein the indicator comprises at least one binary digit and wherein generating the indicator comprises setting at least one binary digit in a bitmap, comprising a plurality of binary digits, associated with the plurality of indicators.

11. A method according to claim 1, wherein the signature representative of the data portion comprises at least one of a most significant bit signature and a least significant bit signature.

12. A method according to claim 1, wherein the first data portion comprises a first section of the first data portion and a second section of the first data portion and wherein processing first data portion comprises alternating between processing the first section of the first data portion and the second section of the first data portion.

13. A method according to claim 1, wherein the data portion comprises image data corresponding to an image frame.

14. A non-transitory, computer-readable storage medium comprising instructions which, when executed by processing circuitry of a computing device, cause the computing device to perform the method of claim 1.

15. A system for processing image data, the system comprising processing circuitry for a convolutional neural network, wherein the processing circuitry is configured to:
    process first image data, corresponding to a first image frame, in a convolutional neural network to generate a first input to an activation function in the convolutional neural network;
    process first image data to generate a first signature representative of the first image data;

provide a first output by applying the activation function to the first input;
store an indicator, representative of the first input to the activation function, for the first image data;
process second image data, corresponding to a second image frame, to generate a second signature representative of the second image data;
compare the first signature with the second signature based at least in part on an evaluation of the indicator for the first image data; and
determine whether to provide a second output by applying the activation function to a second input, generated from the second image data, based at least in part on an evaluation of the indicator for the first image data.

* * * * *